Patented May 7, 1935

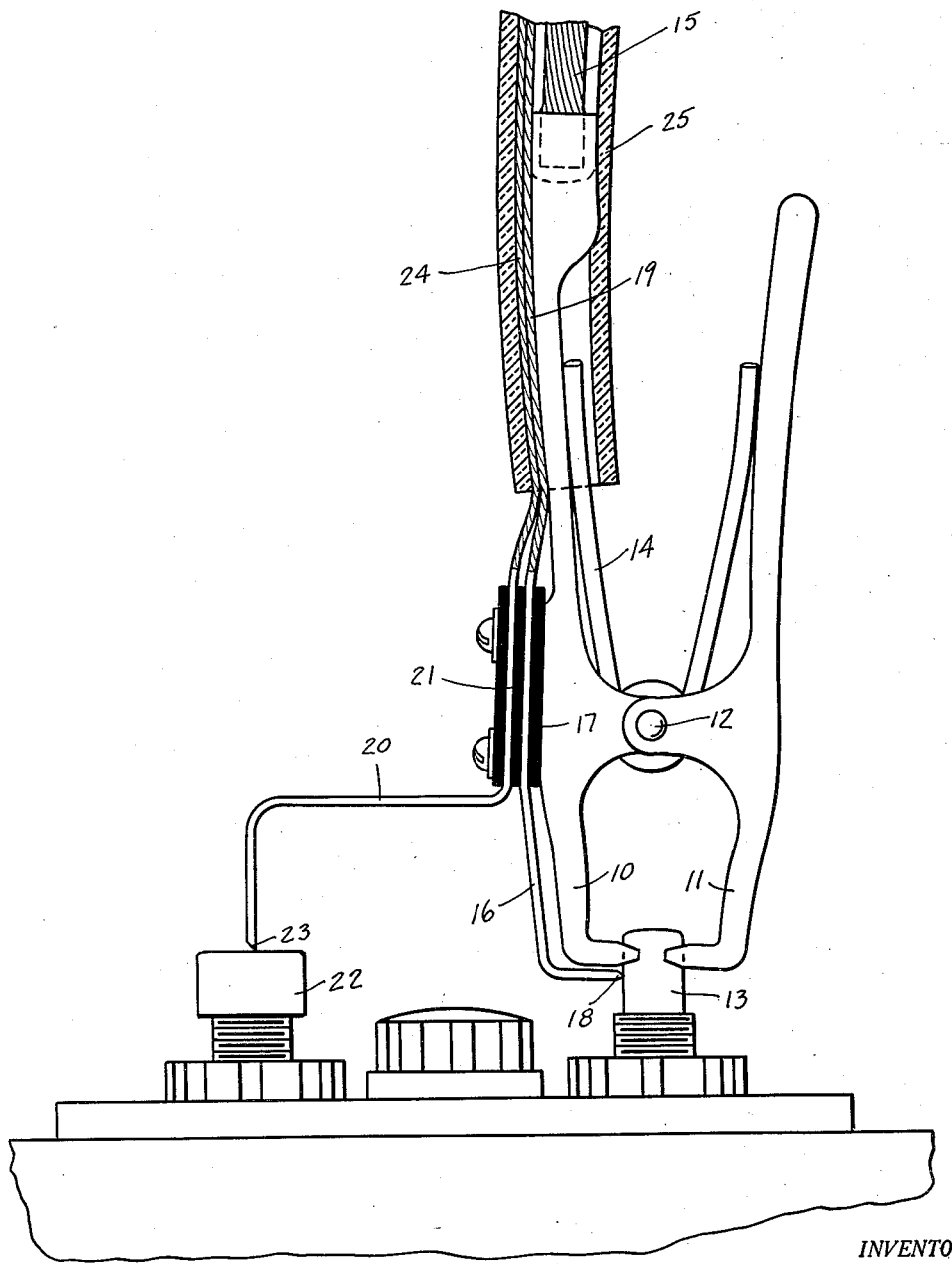

2,000,665

UNITED STATES PATENT OFFICE 2,000,665

BATTERY CLIP

Leon P. Neal, Detroit, Mich., assignor to Joseph Weidenhoff

Application February 10, 1930, Serial No. 427,399

21 Claims. (Cl. 173—324)

This invention relates to a clip for use in making a discharge test of storage batteries. In the testing of storage batteries, it is common practice to arrange the battery to discharge through a variable resistance unit which may be adjusted to draw a given value of current from the battery. When the given current is being discharged, the voltages of the several cells, usually three in number, are read by a voltmeter or voltmeters to indicate the condition of charge of the battery.

The principal object of the invention is to provide a battery clip which makes a better electrical connection with the battery terminals than has heretofore been possible and which reduces the number of clips required for testing a battery.

The principal feature of the invention consists in the provision of grasping jaws adapted to grasp the battery terminals for connecting them to the discharge unit during the test and independent contact members for voltmeter connections carried by said jaws insulated therefrom and adapted to make contact with said terminal when said jaws are applied thereto. The independent contact members are supplied with electrical connections for connection to the voltmeter. Heretofore it has been the practice to use the same conductor for the discharge current and for the voltmeter connection. The voltage drop in the conductor due to the relatively large current flowing therein therefore affects the voltmeter reading. By the use of an independent contact and conductor for the voltmeter the effect of this voltage drop is entirely eliminated.

An additional feature is the provision of a second contact member also carried by one of the jaws and adapted to make a similar contact with an adjacent terminal and likewise used for connection with the indicating voltmeter. By this feature only two clips are required for a discharge test of a three-cell battery.

A third feature is the formation of the voltmeter contacts in such manner that they make wiping or cutting contacts with their respective terminals.

Other objects and features of the invention will be apparent from the following specifications and claims and the attached drawing:

The figure here shown illustrates a battery clip embodying the invention and applied to the terminals of a storage battery.

A pair of jaw members 10 and 11 are hingedly connected by a pin 12 and are adapted to grasp a battery terminal 13. A torsion spring 14 provides the grasping force in a well known manner. The jaw member 10 has attached thereto an electrical conductor 15 for connection to the discharge unit for testing. A spring contact member 16 is supported upon the jaw member 10 and is insulated therefrom by suitable insulation material 17. The spring contact member 16 has a sharpened point 18 which normally projects beyond the grasping portion of the jaw member 10. In the application of the clip to the battery terminal, therefore, the point 18 is pressed against the surface of the terminal. The movement of the said point along the surface as the jaws are pushed down upon the terminal scrapes the surface and allows the point to penetrate a short distance therein. The penetration of the point provides a better contact for the voltmeter reading than can be done by the relatively flat jaws which must have a large surface in contact with the terminal in order to transmit the desired charging current. The spring member 16 has connected thereto an electrical conductor 19 for connection to the voltmeter.

A second spring contact member 20 is likewise fastened to the jaw member 10 and is insulated from the member 16 by insulation material 21. The contact member 20 extends away from the jaw member 10 a sufficient distance to contact with an adjacent battery terminal 22. The member 20 has a sharpened point 23 engaging the surface of the terminal 22 and the said point likewise has a wiping and penetrating action upon the said surface in the application of the clip. An electrical connection 24 is fastened to the contact member 20 for connection to the voltmeter. The electrical connections 15, 19 and 24 are contained in an insulated cable 25.

In the use of the clip for testing an ordinary three-cell battery, one clip is applied to the positive and a second clip to the negative terminal. The contact members 16 and 20 of one clip bridge across the terminals of one outer cell. The contact members 16 and 20 of the second clip bridge across the terminals of the other outer cell. The voltage across the two outer cells may, therefore, be read by connecting a voltmeter to the correspinding conductors 19 and 24 and the voltage across the central cell may be read by connecting a voltmeter to the two terminals 24 of the two clips. Thus, only two clips are required for the discharge testing of all three cells and only two cables are used to connect the battery to the testing apparatus.

The invention claimed is:

1. A battery clip including a clamping member adapted to grasp a battery terminal, a pair of contact members supported upon said clamping member and insulated from each other and from said clamping member, one of said contact members being adapted to make contact with said terminal and the other of said contact members being adapted to make contact with an adjacent terminal, and electrical connections attached to said contact members for connection to a voltmeter for registering the voltage between said terminals.

2. A battery clip as defined by claim 1 having in addition an electrical connection attached to said clamping member for connection to a discharge unit.

3. A battery clip including a clamping member adapted to grasp a battery terminal, a contact member carried thereby, insulated therefrom for making independent contact with said terminal, and an electrical connection to said contact member for connection to a voltmeter for registering the voltage between said terminal and a second battery terminal.

4. A battery clip as defined by claim 3 having in addition an electrical connection attached to said clamping member for connection to a discharge unit.

5. A battery clip including a clamping member adapted to clamp a battery terminal, a spring contact member carried by said clamping member, insulated therefrom and having a pointed end adapted to scrape the surface of an adjacent terminal during application of said jaws and adapted to remain in contact with said terminal when said jaws are applied, and an electrical connection to said contact member for connection to a voltmeter for registering the voltage between said terminals.

6. A battery clip including a clamping member adapted to grasp a battery terminal, a pair of contact members supported upon said clamping member and insulated from each other and from said clamping member, one of said contact members being adapted to make wiping contact with said terminal and the other of said contact members being adapted to make wiping contact with an adjacent terminal, and electrical connections attached to said contact members for connection to a voltmeter for registering the voltage between said terminals.

7. A battery clip as defined by claim 6 having in addition an electrical connection attached to said clamping member for connection to a discharge unit.

8. A battery clip including a clamping member adapted to grasp a battery terminal, a spring contact member carried by said clamping member, insulated therefrom and adapted to make wiping contact with an adjacent terminal, and electrical connections connected to said first terminal and said contact member for connection to a voltmeter for registering the voltage between said terminals.

9. A battery clip as defined by claim 8, having in addition an electrical connection attached to said clamping member for connection to a discharge unit.

10. A battery clip including a clamping member adapted to grasp a battery terminal, a spring contact member carried by said clamping member, insulated therefrom and adapted to make wiping contact with said terminal, and an electrical connection to said contact member for connection to a voltmeter for registering the voltage between said terminal and a second battery terminal.

11. A battery clip as defined by claim 10, having in addition an electrical connection attached to said clamping member for connection to a discharge unit.

12. A battery clip including a clamping member adapted to clamp a battery terminal, a pair of spring contact members carried by said clamping member and insulated therefrom, one of said members having a pointed end adapted to scrape the surface of said terminal during application of said jaws and adapted to remain in contact with said surface when said jaws are applied, the other of said members having a pointed end adapted to scrape the surface of an adjacent terminal during application of said jaws and adapted to remain in contact with the said surface when said jaws are applied, and electrical connections attached to said contact members for connection to a voltmeter for registering the voltage between said terminals.

13. A battery clip including a clamping member adapted to clamp a battery terminal, a spring contact member carried by said clamping member, insulated therefrom and having a pointed end adapted to scrape the surface of said terminal during application of said jaws and adapted to remain in contact with said surface when said jaws are applied, and an electrical connection to said contact member for connection to a voltmeter for registering the voltage between said terminal and a second terminal.

14. A battery clip comprising a pair of pivoted jaws, a spring connected to said clip for clamping said jaws to a battery terminal, handles for said jaws whereby they may be detached from said battery terminal against the action of said spring, an insulated contact member carried by one of said jaws and having a portion thereof movable with respect to said jaw and adapted to engage a second battery terminal, and electrical conductors connected directly to the last mentioned jaw and to said contact member for connecting them to testing apparatus.

15. A battery clip comprising a pair of pivoted jaws, a spring connected to said clip for clamping said jaws to a battery terminal, handles for said jaws whereby they may be detached from said battery terminal against the action of said spring, an insulated contact member carried by one of said jaws and having a portion thereof movable with respect to said jaw and adapted to engage a second battery terminal, and a cable comprising electrical conductors connected directly to one of said jaws and to said contact member for connecting them to testing apparatus, said cable permitting said clip to be secured to batteries disposed at various places around said testing apparatus.

16. A battery device comprising a clip adapted to be secured to spaced terminals of a battery, said clip comprising pivoted paws and contacts, a spring connected to said clip for urging said contacts into engagement with said terminals, extensions of said jaws beyond the pivot to provide handles to move the jaws against the force of said spring, said jaws being normally urged by said spring to clamp said jaws to a battery terminal, a flexible cable secured to said clip, said cable providing means for connection to testing devices at not less than three points, said clip carrying contact means to place two of said connections in conductive relation to one of the spaced terminals and the third into conductive relation to the remaining terminal, said last named connection being insulated from the first two named connections.

17. A binding post contactor for spaced battery posts comprising a pair of resiliently connected, electrically insulated contact members, each of said contact members being urged by the resiliency into wiping engagement with an adjacent battery post, a flexible cable secured to said contactor, said cable providing connection means to testing devices at least at three points, said contact members placing two of said connection means in conductive relation to one of the spaced battery posts and the third connection means into conductive relation to the remaining battery post.

18. The combination with a cable comprising a plurality of electrical conductors, of a battery clip secured directly to one end of said cable and adapted to be connected thereby to testing devices connected solely to the other end of said cable, said battery clip comprising a contact member adapted to be clamped to a battery terminal, and a second contact member carried by and insulated from the first contact member, said second contact member having a part movable with respect to the first contact member and adapted to engage a second terminal of the battery.

19. A binding post contactor for spaced battery posts comprising a plurality of resiliently connected, electrically insulated contact members, each of said contact members being urged by the resiliency into wiping engagement with an adjacent battery post, a flexible cable secured to said contactor, said cable providing connection means to testing devices at least at three points, said contact members placing two of said connection means in conductive relation to one of the spaced battery posts and the third connection means into conductive relation to the remaining battery post.

20. In combination, a binding post contactor for spaced battery posts comprising at least two resiliently connected, electrically insulated contact members, said two electrically insulated contact members being urged by the resiliency into wiping engagement with the spaced battery posts, and a flexible cable comprising at least three flexible conductors secured to said contactor for connecting said contact members to testing devices at least at three points, said contactor placing two of said conductors in conductive relation with one of the spaced battery posts and placing the other of said three conductors into conductive relation with the other battery post.

21. In combination, a binding post contactor for spaced battery posts comprising at least two resiliently connected, electrically insulated contact members simultaneously engaging the spaced battery posts, at least one of said contact members being urged by the resiliency into wiping contact with a battery post, and a flexible cable having one end secured to said contactor and comprising at least three flexible conductors for connecting said contactor to testing devices connected solely to the other end of said cable, said contactor placing two of said conductors in conductive relation to one of the spaced battery posts and placing the third conductor into conductive relation with the other of said battery posts.

LEON P. NEAL.